(12) United States Patent
Ying

(10) Patent No.: US 7,146,713 B1
(45) Date of Patent: Dec. 12, 2006

(54) METHOD OF MANUFACTURING A BASE PLATE

(75) Inventor: Law Kung Ying, Singapore (SG)

(73) Assignee: Cheung Woh Metal Works (Pte) Ltd., Jurong Industrial Estate (SG)

( * ) Notice: Subject to any disclaimer, the term of this patent is extended or adjusted under 35 U.S.C. 154(b) by 50 days.

(21) Appl. No.: 09/640,472

(22) Filed: Aug. 16, 2000

(51) Int. Cl.
*G11B 5/127* (2006.01)
*H04R 31/00* (2006.01)

(52) U.S. Cl. .................. 29/603.16; 29/557; 29/558; 29/603.03; 72/379.2; 360/97.01; 451/5; 451/41

(58) Field of Classification Search ............ 29/603.03, 29/603.16, 557, 558; 72/379.2; 360/97.01; 451/5, 41
See application file for complete search history.

(56) References Cited

U.S. PATENT DOCUMENTS

| | | | | |
|---|---|---|---|---|
| 3,860,803 | A | * | 1/1975 | Levine .................. 700/98 |
| 4,023,313 | A | * | 5/1977 | LeBlanc ................. 451/548 |
| 4,651,773 | A | | 3/1987 | Takahashi et al. |
| 4,785,523 | A | * | 11/1988 | Koseki et al. ............. 29/530 |
| 4,821,403 | A | * | 4/1989 | Rolland et al. .......... 29/603.16 |
| 5,034,837 | A | * | 7/1991 | Schmitz ................ 360/256.2 |
| 5,047,604 | A | | 9/1991 | Grass et al. |
| 5,313,124 | A | * | 5/1994 | Macpherson .............. 310/13 |
| 5,347,888 | A | * | 9/1994 | Yoshino et al. ........... 76/107.1 |
| 5,417,097 | A | | 5/1995 | Kojima et al. |
| 5,584,202 | A | | 12/1996 | Kanamaru et al. |
| 5,587,856 | A | | 12/1996 | Aoyama |
| 5,602,700 | A | * | 2/1997 | Viskochil et al. ........ 360/256.1 |
| 5,624,319 | A | * | 4/1997 | Golczyk et al. ............. 470/21 |
| 5,765,275 | A | * | 6/1998 | Obara .................. 29/603.03 |
| 5,906,083 | A | | 5/1999 | Olsen et al. |
| 5,941,113 | A | | 8/1999 | Kanemitsu et al. |
| 5,966,976 | A | * | 10/1999 | Haraga ..................... 72/57 |
| 6,018,977 | A | | 2/2000 | Kanno et al. |
| 6,023,392 | A | | 2/2000 | Kim |
| 6,063,508 | A | | 5/2000 | Hanrahan et al. |
| 6,075,695 | A | | 6/2000 | Konno et al. |
| 6,084,750 | A | | 7/2000 | Shimazu et al. |
| 6,178,061 | B1 | | 1/2001 | Obara |
| 6,191,921 | B1 | | 2/2001 | Hanrahan et al. |
| 6,227,029 | B1 | | 5/2001 | Stanley |
| 6,275,353 | B1 | | 8/2001 | Briggs |
| 6,307,713 | B1 | | 10/2001 | Miyata et al. |
| 6,327,151 | B1 | | 12/2001 | Chen et al. |
| 6,337,782 | B1 | * | 1/2002 | Guerin et al. ............ 360/256.1 |
| 6,382,064 | B1 | | 5/2002 | Dugger |
| 6,389,869 | B1 | | 5/2002 | Wakita et al. |
| 6,397,651 | B1 | | 6/2002 | Usui et al. |
| 6,402,009 | B1 | * | 6/2002 | Ishikawa .................. 228/6.2 |

(Continued)

FOREIGN PATENT DOCUMENTS

JP    58077720  A  *  5/1983

(Continued)

OTHER PUBLICATIONS

Aluminum Extrusion Industries (AEI) Brochure, "Quality That Always Shines Through," 3 pages (Prior to Aug. 16, 2000).

(Continued)

*Primary Examiner*—Paul D Kim
(74) *Attorney, Agent, or Firm*—Blakely, Sokoloff, Taylor & Zafman LLP

(57) ABSTRACT

A method for forming a base plate in which the base plate is stamped out of a sheet of metal. One of a relief surface and a boss are formed in the base plate by press working the base plate.

17 Claims, 13 Drawing Sheets

U.S. PATENT DOCUMENTS

| | | | |
|---|---|---|---|
| 6,411,581 B1 * | 6/2002 | Saitou et al. | 369/75.1 |
| 6,426,847 B1 * | 7/2002 | Dague et al. | 360/97.01 |
| 6,427,317 B1 * | 8/2002 | Choi | 29/603.03 |
| 6,542,459 B1 * | 4/2003 | Miyazaki et al. | 720/744 |
| 6,608,732 B1 | 8/2003 | Bernett et al. | |

FOREIGN PATENT DOCUMENTS

| | | | |
|---|---|---|---|
| JP | 63036932 A | * | 2/1988 |
| JP | 5-094668 A | | 4/1993 |
| JP | 05123755 A | * | 5/1993 |
| JP | 8-153386 A | | 6/1996 |
| JP | 9-120669 A | | 5/1997 |

OTHER PUBLICATIONS

Japanese Standards Association, "JIS Handbook 1986: Non-Ferrous Metals and Metallurgy," pp. 605, 608, 611, 613, 617, and 639-641 (1986).

Aida Press Handbook (Third Edition) by Aida Engineering, Ltd., pp. 21-29, 52-55, 63, 65, 391-394, 398-400, and 449 (1992).

The E Coating Process Overview, Jan. 2, 1998.

New Leveler Feeder 300-E/300-R, AIDA Brochure, 2 pages (Prior to Aug. 16, 2000).

Aluminium Extrusion Industries (AEI) Singapore: Company profile (3 pages).

JIS Handbook 1986: Non-Ferrous Metals and Metallurgy, by Japanese Standards Association, Pertinent Pages: cover; forward; index (p. 9); p. 4 showing example.

AIDA Press Handbook (Third Edition) by Aida Engineering, Ltd. (cover page); forward; and contents of referenced handbook (13 pages).

LFL New Leveler Feeder 300-E/300R (p. 1, picture w/description) (p. 2, LFL main specification s and options) extracted from JIS Handbook.

* cited by examiner

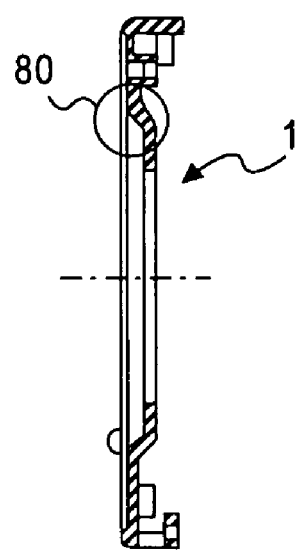 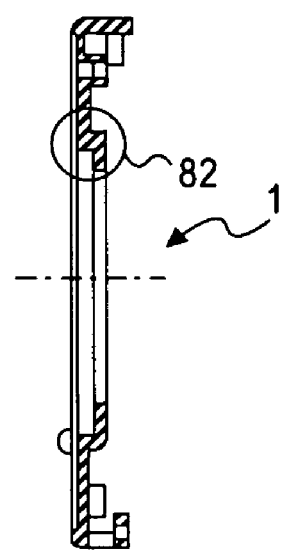
FIG. 6   FIG. 7

METHOD OF MANUFACTURING A BASE PLATE

BACKGROUND

1. Field of the Invention

This invention relates generally to the field of a manufacturing process for metal parts and more specifically, a manufacturing process for forming a base plate used in a hard disk drive.

2. Background

Hard disk drives used in computer systems are known in the art. Hard disk drives are used to store data in a computer system and may store, for example, 20 megabytes to 10 gigabytes of data. Base plates support the hard disk drive.

Conventional base plate manufacturing processes include (1) aluminum die casting, (2) press working a sheet of metal with side frames mounted on opposing sides, and (3) an extrusion method that includes press working. Each of these methods is described below.

A. Aluminum Die Casting

A base plate may be manufactured by an aluminum die casting process. Because aluminum die casting generally uses injection molding, pores are typically formed on the inside of the molded product. Pores on the inside of the product can change the properties of the aluminum material and cause corrosion or outgassing. Outgassing involves the removal of gas from a metal by heating the metal to a temperature below melting while maintaining a vacuum in the space around the metal. To compensate for these deficiencies, E-coating, a type of paint known in the art, is applied to the base plate that is produced from the aluminum die casting process.

There are numerous disadvantages related to quality, cost, and production time to using the aluminum die casting process. For example, aluminum die casting and E-coating typically result in dimensional imprecision. Therefore, the important datums need to be machined after the E-coating has been applied to the base plate. Furthermore, the quality of the base plate is affected because porosity or pin holes generally form on the surface or inside of the base plate that is produced, which affects the rigidity of the base plate. Machining of an E-coated base plate, which is required to obtain the proper dimensions, exposes the casting surface of the base plate and may cause contamination on the inside of the base plate. This reduces the reliability of the base plate. Another disadvantage to aluminum die casting relates to cost. For example, the metallic molds used in aluminum die casting are typically very expensive and have a short tool life. Additionally, there are numerous steps involved in the aluminum casting process. Each process step adds cost and increases the production cycle time. Another disadvantage is that a high yield loss typically exists due to the aluminum being melted and then injected in the cavity of the mold. E-coating typically also raises the cost of production and may have an outgassing problem.

B. Press Working with Side Frames Mounted on Each Opposite Side

Another process for manufacturing base plates relates to press working with side frames mounted on each opposite side. A base plate is press worked to form a concave portion 23 with a few holes for motor mounting 24, as illustrated in FIGS. 1 and 2. The two side frames 22 are press worked from sheet metal and are fixedly mounted on the opposite sides of the base plate.

There are several disadvantages to this conventional process. For example, fixing the two side frames 22 to the base plate is an additional assembly step that increases the cost of manufacturing. The side frames must be strictly controlled in the mounting position and the mounting strength. Another disadvantage is that relief surfaces for elements such as the disk, the actuator, the voice coil motor, the filter, and bosses or semi-pierces are not a part of this process. Instead, generally all relief surfaces are formed by a machining operation although press working may be used to form a motor mounted concave portion with a few holes. Additionally, oil and other residue that is used during the cold working operation must be removed by washing the finished base plate.

C. Extrusion Method

The extrusion method is another process used to manufacture a hard disk drive base plate. An aluminum base member is manufactured by extruding a predetermined cross-sectioned shape having a pair of frame portions on its sides 23. The extruded product is then cut to a predetermined length. The half-finished product may then be subjected to press working to form a motor mounting concave portion with a few holes as shown in U.S. Pat. No. 5,766,275 issued to Obara entitled Method of Manufacturing Hard Disk Drive Unit. This half-finished product must also be machined with a stepped hole for mounting the motor. Additional relief surfaces such as for the disk, the actuator, the voice coil motor, the filter mount and other datums are machined during machining operation.

There are several disadvantages to this process. For example, extruding material is costly because of the multiple steps involved. For instance, an aluminum billet must be formed from the aluminum ingot. The aluminum billet is then further processed. Additionally, the motor mounting "stepped hole" must be machined during a machining operation. The machining operation cycle time increases as additional relief surfaces are required.

SUMMARY OF THE INVENTION

A method is disclosed for providing a sheet of metal and forming a base plate in which one of a relief surface and a boss are formed by press working a base plate. Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 6 illustrates a cross-sectional view of a concave base plate having a sloped portion in accordance with one embodiment of the invention;

FIG. 7 illustrates a cross-sectional view of a concave base plate having a stepped portion in accordance with one embodiment of the invention;

DETAILED DESCRIPTION

One embodiment of the invention relates to a process for manufacturing a base plate used in hard disk drives in which a sheet of metal is press worked (e.g., stamped, forged, etc.). Press working cuts out the base plate from the sheet of metal. Press working is also used to form relief surfaces and bosses in a base plate. By forming relief surfaces and bosses through press working, the machining process is minimized and machining is only required for surfaces such as the motor sitting area, the actuator sitting area, and potentially the voice coil motor sitting area.

Additionally, the base plate is free from cavity problems associated with aluminum die casting. Therefore, E-coating is not required. Moreover, techniques of embodiments of the invention do not require a separate side mounting bracket as in conventional methods because the press working operations are continuously performed as the sheet of metal is moved from one press working operation to the next press working operation. Techniques of embodiments of the invention also do not require separate operations such as extrusion to form a half finished product with two side frames followed by press working to form a motor mounting concave portion with a few holes.

In addition to reducing manufacturing steps compared to conventional methods, embodiments of the invention also improve the quality of the base plate because press working is generally more accurate dimensionally than, for example, die-casting. The rigidity of the base plate is also improved because there is work-hardening of the sheet metal due to numerous press worked operations.

For one embodiment, a sheet of metal in strip form or coil form is stamped in a progressive die or a series of transfer dies in a sequence of press working operations. Press working operations include trimming, piercing, forging, stamping, bending, forming processes, coining, or other suitable processes. Coining relates to imprinting a shape of a face, an image, or a shape on a metal sheet. The metal used is typically an aluminum alloy such as aluminum 5052 in the form of a plate, coiled sheet circle, or other suitable form. Other suitable materials may also be used.

Figure 1:
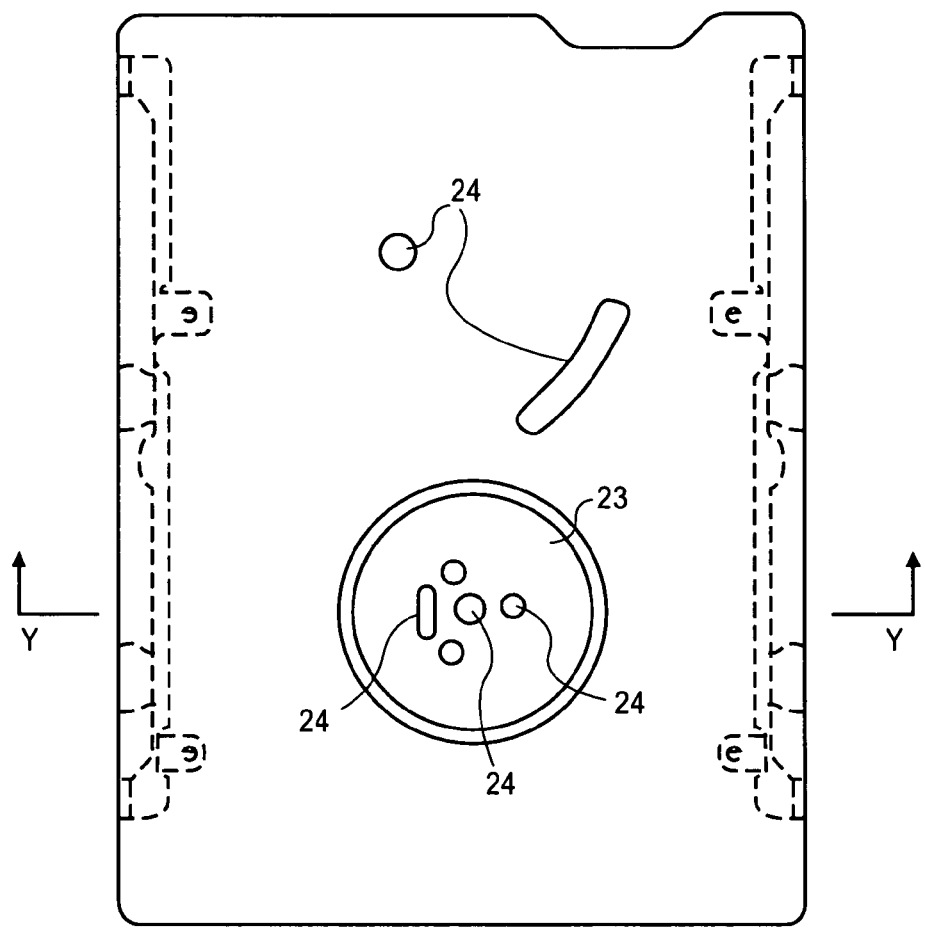
FIG. 1 illustrates a top view of a base plate of the prior art.
Figure 2:
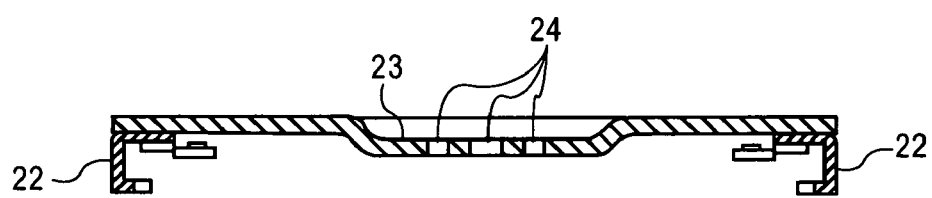
FIG. 2 illustrates a cross-sectional view of a base plate of the prior art.
Figure 3:
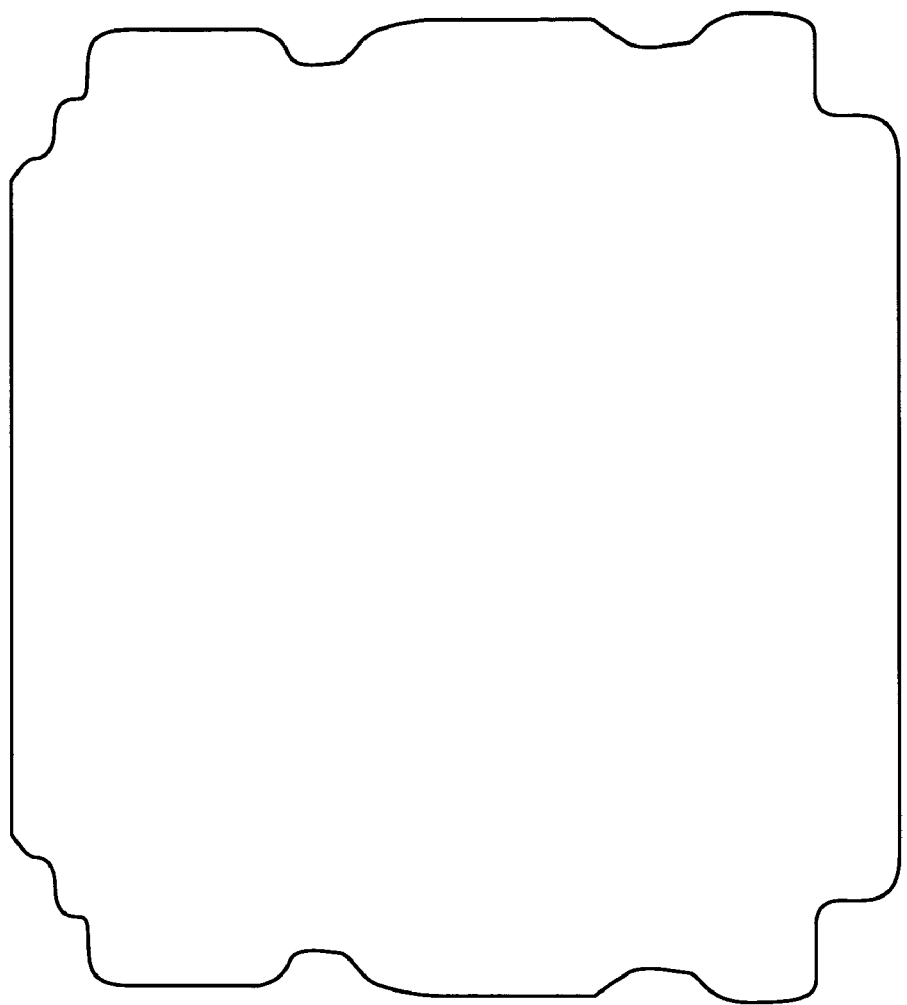
FIG. 3 illustrates a blank base plate in accordance with one embodiment of the invention.

The sheet of metal may be supported, for example, on a conveyor belt while the sheet of metal is fed into position such that a portion of the sheet metal is located between two dies for the first press working operation. In the first press working operation such as a stamping operation, a blank of the base plate illustrated in FIG. 3 is cut from the sheet of metal.

Figure 4:
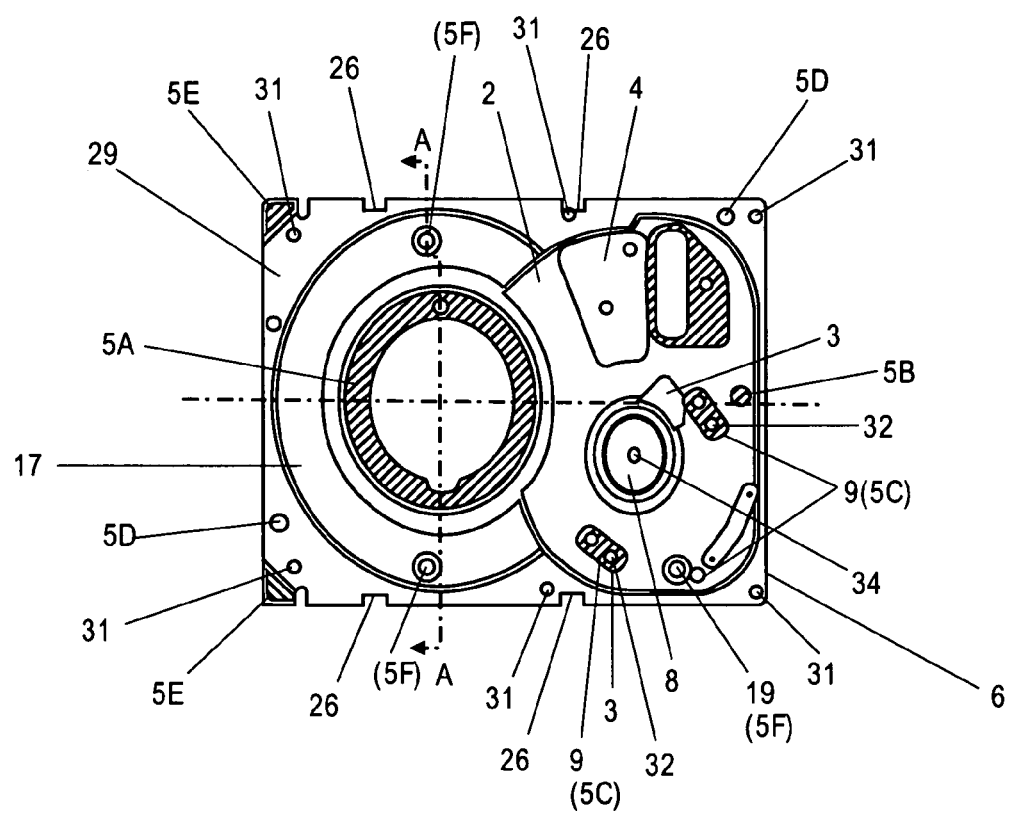
FIG. 4 illustrates a top view of a base plate in accordance with one embodiment of the invention.
Figure 5:
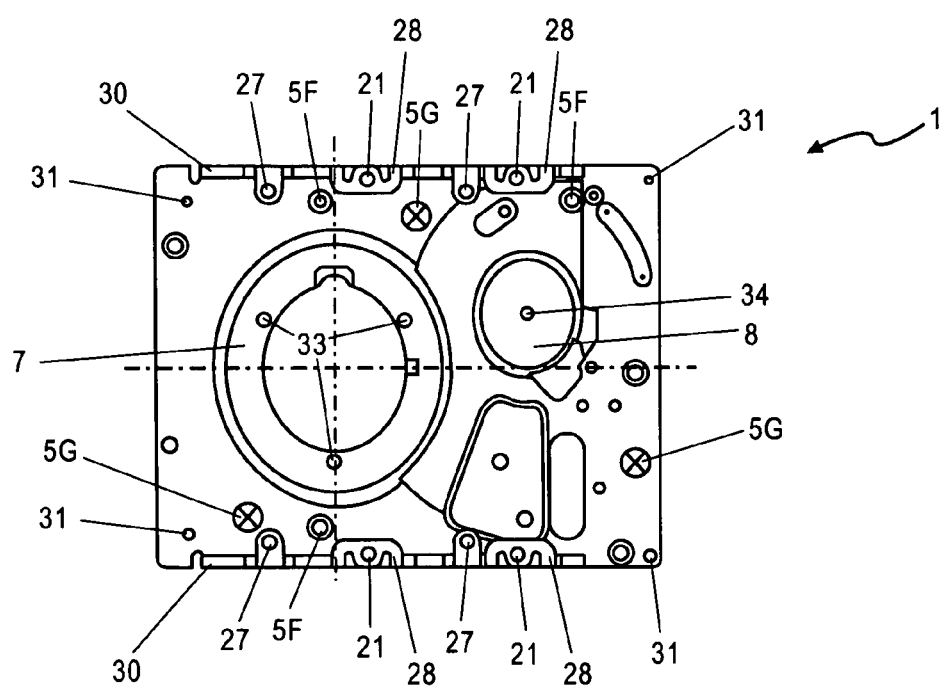
FIG. 5 illustrates a bottom view of a base plate in accordance with one embodiment of the invention.

The blank base plate is advanced until the blank base plate is located between a first die above the blank base plate and a second die below the blank base plate. The dies press into the blank base plate to form at least one or more relief surfaces. FIG. 4 illustrates the relief surfaces on the top surface of base plate 1 whereas FIG. 5 illustrates the relief surfaces on the bottom surface of base plate 1. The relief surfaces include a disk relief surface 17, an actuator relief surface 2, a voice coil motor relief surface 3, a filter mount relief surface 4, and bosses or semi-pierces. The bosses or semi-pierces include a motor mount boss 5*a*, an actuator mount boss 5*b*, a voice coil motor ("VCM") mount boss 5*c* with or without a mounting holes 32, a top cover locating boss 5*d*, a Z datum 5*e*, a printed circuit board ("PCB") mount boss 5*f* with or without a mounting hole, and boss 5*g*. For an alternative embodiment, instead of all or most of the relief surfaces and bosses being formed in one press working operation, each relief surface or boss may be formed individually as the sheet of metal is advanced to each press working operation in which two dies press against base plate 1. Once the dies release base plate 1, a relief surface or boss is formed in base plate 1.

The press working operation that follows the formation of the relief surfaces and bosses involves trimming relief 26 for damper mounting hole 27, bottom mounting hole 21, and bend relief 28. In this trimming operation, excess metal is cut away from the base plate. The trimming operation involves any suitable conventional means for removing excess metal from base plate 1.

Figure 8:
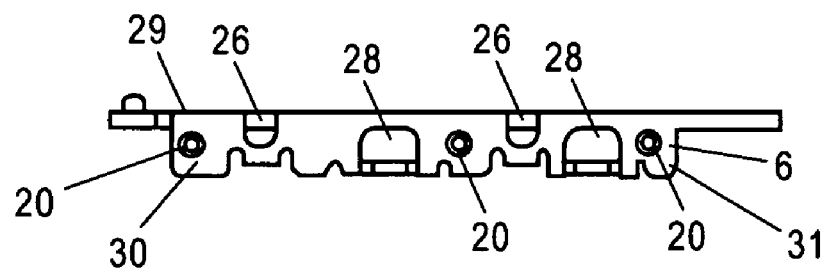
FIG. 8 illustrates a cross-sectional view of a base plate in accordance with one embodiment of the invention.

Bend reliefs (26, 27) are formed in another press working operation after the U-bending of side frame 6. Bend reliefs may be formed by a separate press working operation for transfer forming. Alternatively, if progressive dies are used, bend reliefs are made with the same tooling die before a U-bending operation. The next operation involves U-bending. U-bending of base plate 1 to form side frames 6 typically occurs before or after datums are refined by machining. If the base plate requires additional trimming, the base plate is then advanced to a final trimming operation. U-bending involves pressing a portion of the sheet of metal into a u-shape in which side frames 6 illustrated in FIG. 8 are substantially perpendicular to the top and bottom surfaces of base plate 1. Specifically, a cam assisted punching die may be used to form right angles in base plate 1.

If necessary, top side 29 of FIGS. 4 and 8, left side 30, and right side 31 illustrated in FIGS. 5 and 8 of the finished press worked base plate 1 may need to undergo conventional face milling due to slight deformations resulting from the press working operations. The operator generally makes the determination as to whether face milling should be performed.

Base plate 1 is then machined to refine datums such as the motor sitting area 7 with three tapped holes 33 and actuator sitting area 8 with one tapped hole 34. If necessary, the voice coil motor sitting area 9 may also be machined.

The base plate is then advanced to the last machining operation in which holes in the base plate are formed by drilling, stamping, or other suitable process. Tapping of the holes may be used, if necessary. The holes include the VCM mounting holes 32, left and right mounting holes 20, top cover mounting holes 31, damper mounting holes 27, bottom side mounting holes 21, and PCB mounting holes 19. The base plate is then cleaned of any residual dirt.

FIGS. 6–8 illustrate cross-sectional view of examples of finished base plates formed by implementing techniques of embodiments of the invention. FIGS. 6 and 7 illustrate a cross section of a concave base plate 1 that may be manufactured by using techniques of embodiments of the invention. While FIG. 6 shows base plate 1 that has a sloped portion 80, FIG. 7 illustrates a stepped portion 82. The purpose of forming a sloped portion 80 or a stepped portion 82 relates to the type of base plate 1 that is being manufactured and the motor that is to be mounted on base plate 1.

FIG. 8 shows another cross section of the base plate after base plate 1 has completed all press working operations and all of the holes have been drilled, stamped, or tapped. In particular, FIG. 8 shows mounting holes 20 formed on the right side 31 of base plate 1. Bend reliefs (26, 28) are formed in base plate 1. Bend reliefs 26 are located substantially uniformly apart from one another. Bend reliefs 28 are also located substantially uniformly apart from one another.

Figure 9:
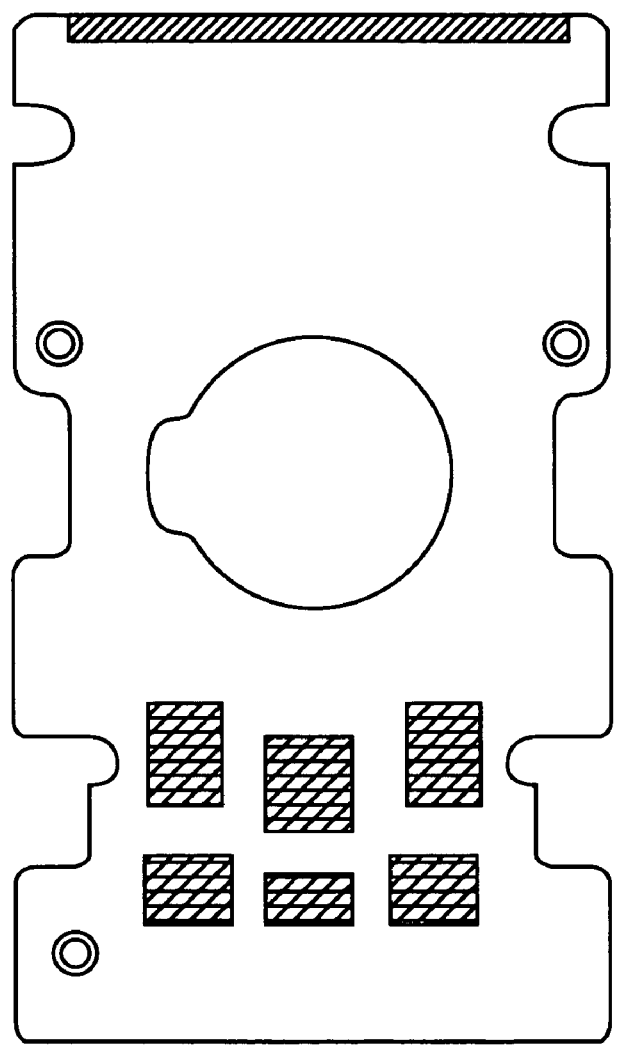
FIG. 9 illustrates a printed control board used in the assembly of a hard disk drive.
Figure 10:
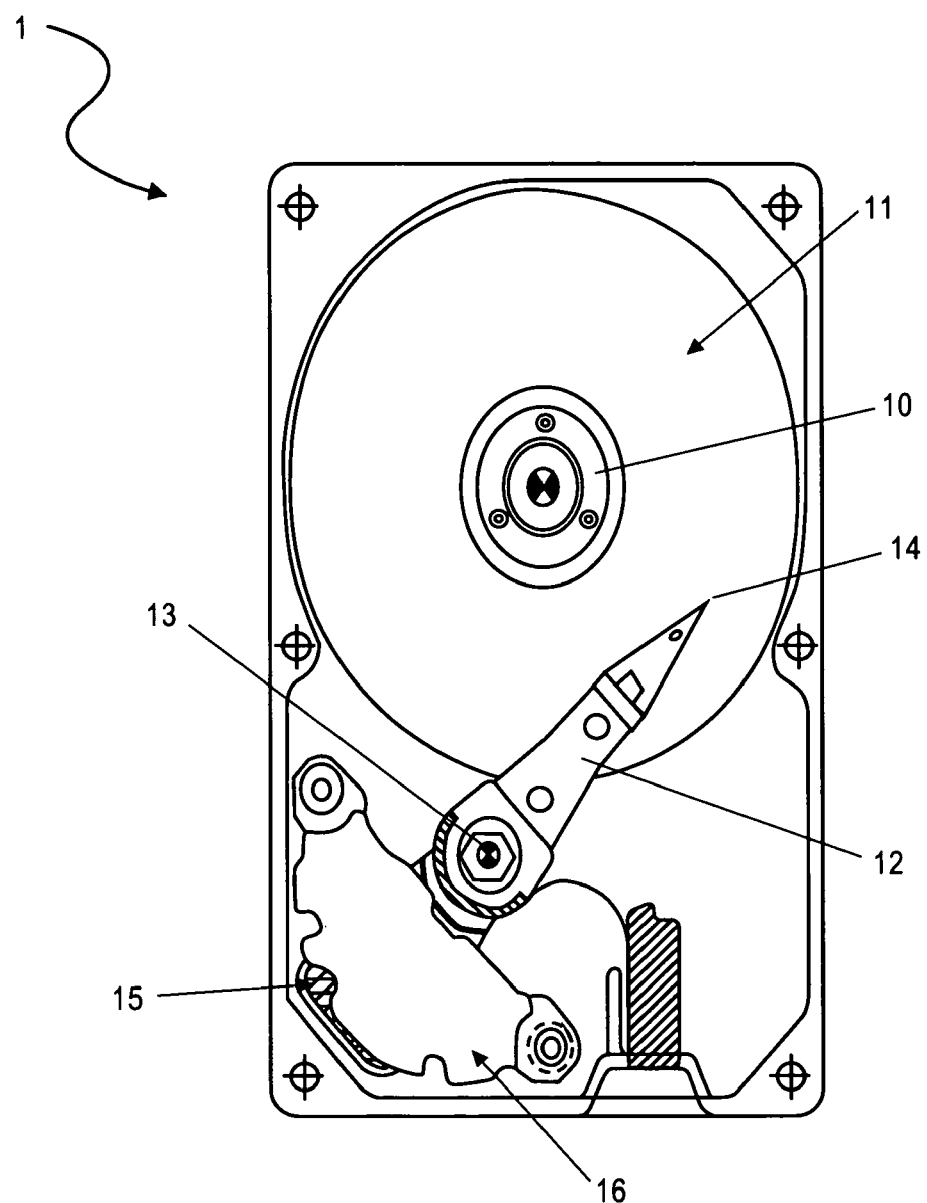
FIG. 10 illustrates a base plate with elements thereon in accordance with one embodiment of the invention.
Figure 11:
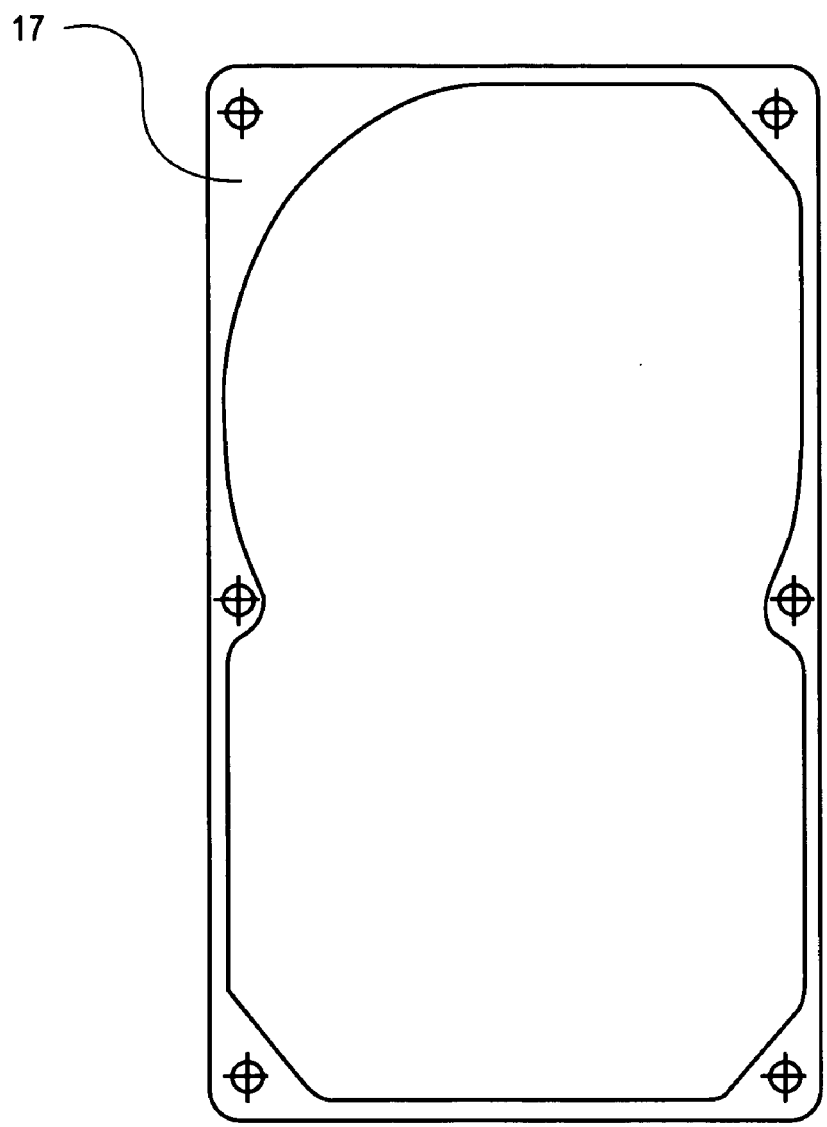
FIG. 11 illustrates a top cover in accordance with one embodiment of the invention.
Figure 12:
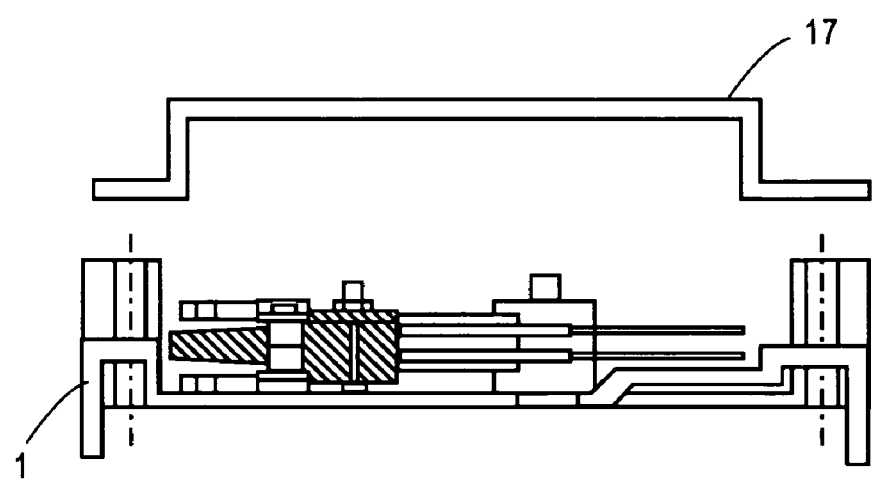
FIG. 12 illustrates an assembled disk drive plate in accordance with one embodiment of the invention.

FIGS. 9–11 illustrate the assembly of a hard disk drive using base plate 1 formed by implementing techniques of embodiments of the invention. FIG. 9 illustrates a conventional printed circuit board 18 that is used in the assembly of the hard disk drive shown in FIG. 12. Printed circuit board 18 is fixed to base plate 1 using conventional means. Top cover 17 shown in FIG. 11 is fixedly mounted to base plate 1 as illustrated in FIG. 12. Conventional means are also used to mount top cover 17.

FIG. 10 illustrates base plate 1 that is formed by implementing techniques of the invention with elements that form the hard disk drive. Base plate 1 is used to mount a spindle motor 10 for rotating a magnetic disk. Base plate 1 also mounts an actuator arm 12 that pivots radially about a shaft on pivot bearing 13. Actuator arm 12 is coupled to several elements of the hard disk drive. At one end of actuator arm 12 is one or more magnetic heads 14. Magnetic head 14 is configured to read and write data onto the magnetic disk 11. At the other end of the actuator arm 12 is a voice coil 15 that is connected to voice coil motor assembly 16. Voice coil assembly 16 radially moves actuator arm 12. Actuator arm 12 also mounts a top cover 17 shown in FIG. 12 to sealably enclose magnetic disk 11 and voice coil motor assembly 16. Actuator arm 12 further mounts a printed circuit board 18 on the bottom side with holes 19 provided. Actuator arm 12 is connected at the side frames 6 with holes 20 or bottom side holes 21 onto a casing unit as an auxiliary memory.

Figure 13:
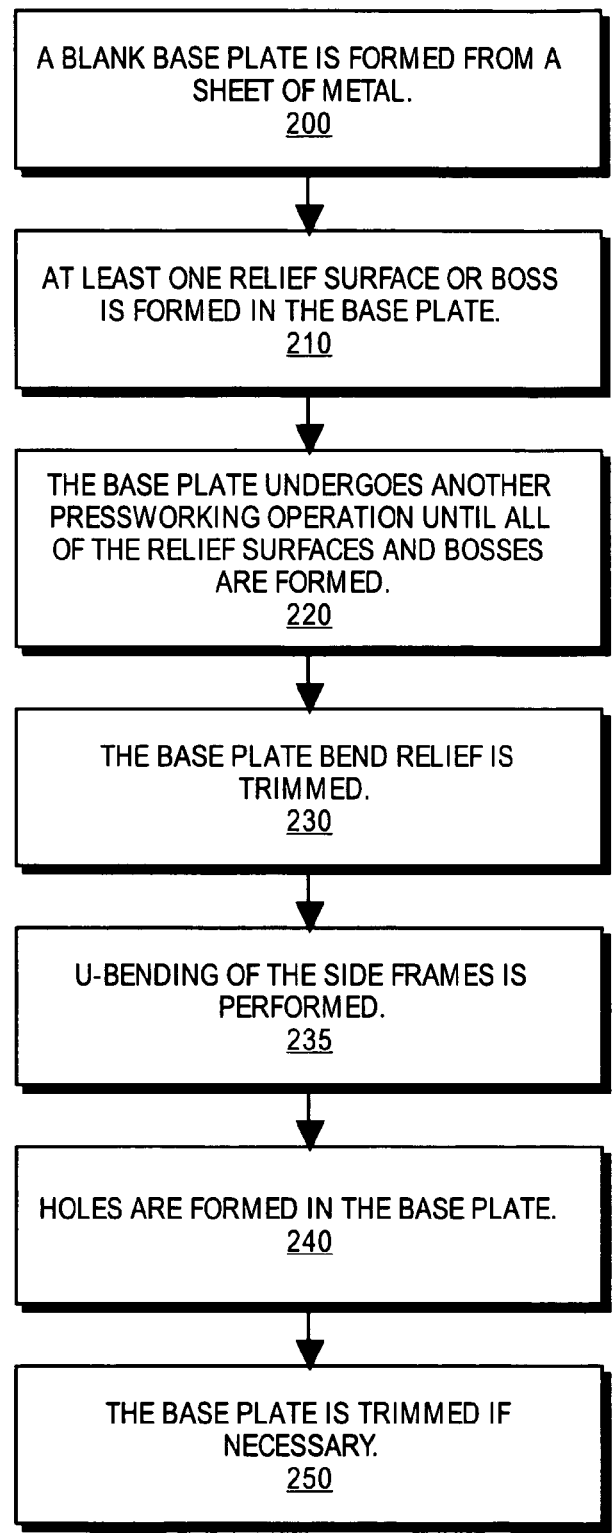
FIG. 13 illustrates a flow diagram for forming a base plate through press working operations such as progressive or transfer forming operation in accordance with one embodiment of the invention.

FIG. 13 illustrates a flow diagram for forming a base plate through a press working operation such as progressive or transfer forming in accordance with one embodiment of the invention. At block 200, a sheet or other form of metal is positioned between two dies. The dies press against the sheet of metal and form a blank base plate. At block 210, at another press working operation, at least one relief surface or boss is formed in the base plate. At block 220, the base plate is advanced to another position in which the base plate undergoes another press working operation. Various press working operations are continued until all of the relief surfaces and bosses are formed in the base plate. At block 230, the base plate bend relief (26, 27) is trimmed. At block 235, U-bending of the side frames of the base plate is performed. At block 240, holes are formed in the base plate. At block 250, the base plate may be trimmed again if necessary.

Figure 14:
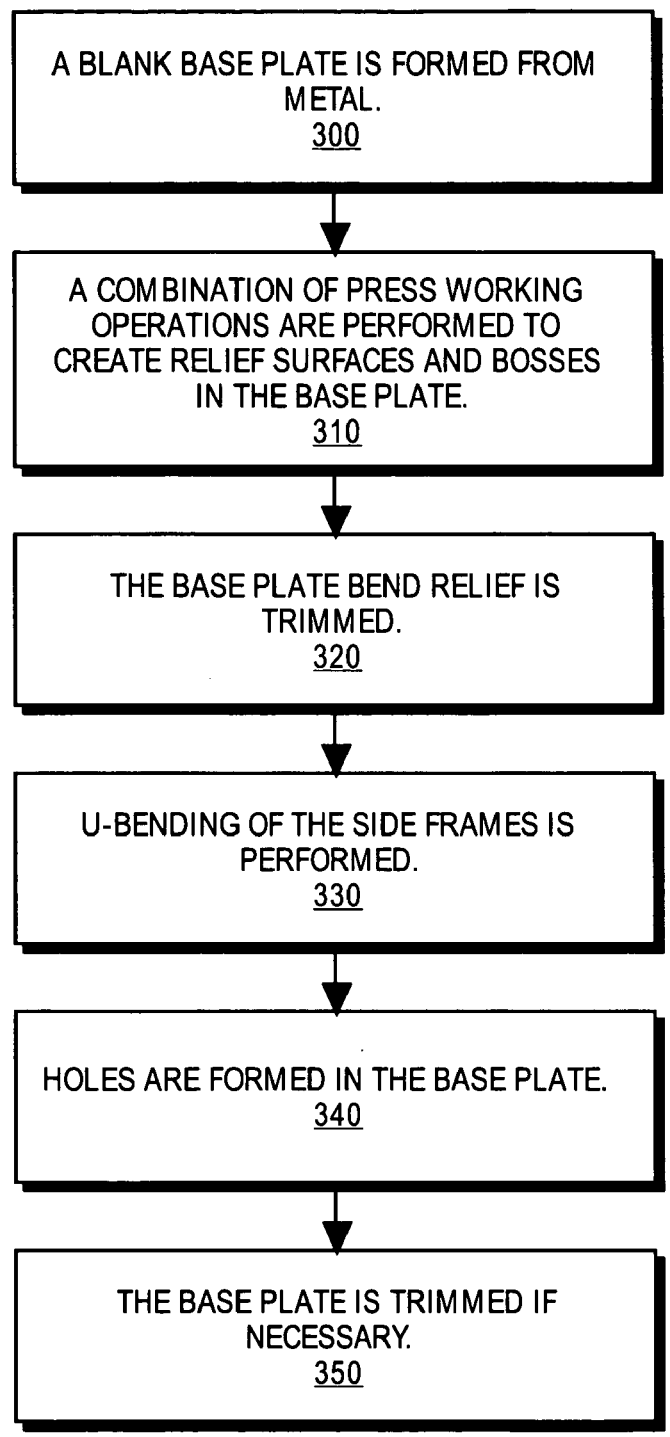
FIG. 14 illustrates a flow diagram for forming a base plate through press working operations such as progressive or transfer forming operations in accordance with one embodiment of the invention.

FIG. 14 illustrates a flow diagram for forming a base plate through press working operations in accordance with one embodiment of the invention. At block 300, metal is positioned between two dies. The dies press against the metal to form a blank base plate. At block 310, a combination of press working operations such as piercing, trimming, coining, forging, and forming or other suitable operation are used. These press working operations form features such as a disk relief surface, an actuator relief surface, a VCM relief surface, a filter mount relief surface, bosses or semi-pierces.

The bosses or semi-pierces include motor mount bosses, an actuator mount boss, a VCM mount boss, a top cover locating boss, a Z-datum, and a PCB mount boss. These feature may be formed by two or more such as fourteen press working operations. It will be appreciated that the number of press working operations may depend upon the complexity of the base plate.

At block 320, the base plate is trimmed to the desired shape. Trimming of the base plate can be performed in the progressive forming operation, a transfer forming operation or other suitable operation.

At block 330, U-bending of the side frames to the base plate is performed. Y-bending typically involves two steps. First, one side frame is bent. Second, the other side frame is bent. This forms the U-bend of the side frames.

At block 340, holes are formed in the base plate if necessary. At block 350, the base plate is trimmed if necessary.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to form a disk drive base plate, the method comprising:
    press working a sheet of metal to form a blank base plate, having a top surface and a bottom surface, by placing a top die in contact with the top surface and a bottom die in contact with the bottom surface;
    press working the blank base plate to form a plurality of relief surfaces and bosses in the blank base plate in one press working operation;
    u-bending a portion of the blank base plate with a punching die to form a side frame that is substantially perpendicular to the top surface and the bottom surface;
    bending a portion of the side frame to form a bend relief that extends over the bottom side of the blank base plate; and
    forming mounting holes in the side frame.

2. The method of claim 1, wherein the relief surface is one of a disk relief surface, an actuator relief surface, a voice coil motor relief surface, and a filter mount relief surface.

3. The method of claim 2, further comprising:
    trimming the relief surface.

4. The method of claim 1, wherein the boss is one of a motor mount boss of concave type, a motor mount boss of stepped type, an actuator mount boss, a top cover locating boss, a PCB mount boss with a mounting hole, a PCB mount boss without mounting hole, a VCM mount boss having a mounting hole, and a VCM input boss without a mounting hole.

5. The method of claim 1, further comprising:
    forming holes in the disk drive base plate.

6. The method of claim 5, wherein the holes in the side frame and the disk drive base plate are one of VCM mounting holes, a left mounting hole, a right mounting hole, a top cover mounting hole, a damper mounting hole, a bottom side mounting hole, and a PCB mounting hole.

7. The method of claim 5, wherein the holes are formed by one of drilling, stamping, and tapping.

8. The method of claim 1, further comprising:
    milling the top surface of the disk drive base plate.

9. The method of claim 8, further comprising:
    machining the relief surface.

10. The method of claim 9, wherein the relief surface is one of an actuator relief surface, a motor relief surface, and a VCM relief surface.

11. The method of claim 1, wherein the press working is one of piercing, trimming, stamping, coining, forging, bending, and forming.

12. A method for forming a disk drive base plate comprising:
   press working a sheet of metal to form a blank base plate, having a top surface and a bottom surface by placing a top die in contact with the top surface and a bottom die in contact with the bottom surface,
   press working the blank base plate to form at least a relief surface, a boss, and a datum in one press working operation;
   trimming the relief surface;
   u-bending a portion of the blank base plate with a punching die to form a side frame that is substantially perpendicular to the top surface and the bottom surface;
   bending a portion of the side frame to form a bend relief that extends over the bottom side of the blank base plate;
   forming mounting holes in the side frame;
   milling the top surface and the bottom surface of the base plate; and
   machining the datum.

13. The method of claim 12, wherein the relief surface is one of a disk relief surface, an actuator relief surface, a voice coil motor relief surface, and a filter mount relief surface.

14. The method of claim 12, wherein the press working is one of piercing, trimming, stamping, coining, forging, bending, and forming.

15. The method of claim 12, wherein the datum is one of an actuator mounting area, a motor mounting area, and a VCM mounting area.

16. The method of claim 12, further comprising:
   forming at least one hole in the sheet of metal.

17. The method of claim 16, wherein the at least one hole is formed by one of drilling, stamping, and tapping.

* * * * *